United States Patent
Ofer et al.

(10) Patent No.: US 11,366,764 B2
(45) Date of Patent: Jun. 21, 2022

(54) MANAGING A LEAST-RECENTLY-USED DATA CACHE WITH A PERSISTENT BODY

(71) Applicant: International Business Machines Corporation, Armonk, NY (US)

(72) Inventors: Effi Ofer, Ramat Gan (IL); Ety Khaitzin, Petah Tikva (IL); Ohad Eytan, Karmel Katif (IL)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 17/036,108

(22) Filed: Sep. 29, 2020

(65) Prior Publication Data

US 2022/0100677 A1 Mar. 31, 2022

(51) Int. Cl.
- *G06F 12/12* (2016.01)
- *G06F 12/123* (2016.01)
- *G06F 12/0891* (2016.01)
- *G06F 12/02* (2006.01)
- *G06F 12/0871* (2016.01)
- *G06F 12/0813* (2016.01)

(52) U.S. Cl.
CPC ........ *G06F 12/123* (2013.01); *G06F 12/0238* (2013.01); *G06F 12/0813* (2013.01); *G06F 12/0871* (2013.01); *G06F 12/0891* (2013.01)

(58) Field of Classification Search
CPC ............... G06F 12/123; G06F 12/0238; G06F 12/0813; G06F 12/0871; G06F 12/0891
See application file for complete search history.

(56) References Cited

U.S. PATENT DOCUMENTS

| 6,192,450 B1 | 2/2001 | Bauman |
| 9,390,116 B1 * | 7/2016 | Li .................. G06F 16/2272 |
| 9,460,025 B1 | 10/2016 | Wallace |

(Continued)

FOREIGN PATENT DOCUMENTS

| CN | 111159066 A | 5/2020 |
| WO | 2009144384 A1 | 12/2009 |

OTHER PUBLICATIONS

Chen et al., "Me-CLOCK: A memory-efficient framework to implement replacement policies for large caches", IEEE Transactions On Computers, vol. 65, No. 8, Aug. 2016, 7 Pages.

(Continued)

*Primary Examiner* — Pierre Michel Bataille
(74) *Attorney, Agent, or Firm* — Stephen R. Yoder

(57) ABSTRACT

A method for managing a data cache, comprising: storing a cache management list comprising a plurality of entries and having: a tail part stored in a first storage and documenting recently accessed data items stored in the data cache, a body part stored in a second storage and documenting less recently accessed data items stored in the data cache, and a head part stored in the first storage and documenting least recently accessed data items stored in the data cache; and in each of a plurality of iterations: receiving at least one data access request; documenting the data access request in the tail; identifying a plurality of duplicated entries present in the body and the tail; and removing each of the plurality of duplicated entries from the body in the second storage according to a physical organization in the second storage of the plurality of duplicated entries.

21 Claims, 6 Drawing Sheets

(56) References Cited

U.S. PATENT DOCUMENTS

| | | |
|---|---|---|
| 10,013,344 B2 | 7/2018 | Bert |
| 10,078,598 B1* | 9/2018 | Wallace .............. G06F 12/0842 |
| 10,102,147 B1 | 10/2018 | Benhanokh |
| 2012/0144098 A1* | 6/2012 | Yang ....................... G06F 3/068 |
| | | 711/112 |
| 2015/0372910 A1* | 12/2015 | Janakiraman ........... H04L 45/74 |
| | | 370/392 |
| 2019/0042113 A1 | 2/2019 | Li |
| 2019/0258582 A1 | 8/2019 | Miao |

OTHER PUBLICATIONS

Ungureanu et al., "TBF: A memory-efficient replacement policy for flash-based caches", 2013 IEEE 29th International Conference on Data Engineering (ICDE), IEEE, 2013, 12 Pages.

"Patent Cooperation Treaty PCT International Search Report", Applicant's file reference P201910919, International application No. PCT/IB2021/058752, International filing date Sep. 25, 2021, dated Jan. 13, 2022, 7 pages.

\* cited by examiner

MANAGING A LEAST-RECENTLY-USED DATA CACHE WITH A PERSISTENT BODY

BACKGROUND

Some embodiments described in the present disclosure relate to managing a data cache and, more specifically, but not exclusively, to managing a data cache using fast access memory.

In computing, a data cache is a component that stores data temporarily so that future requests for that data can be served faster than the first request for that data. A data cache may comprise hardware, software, or both. Data stored in a data cache might be the result of an earlier computation or a copy of data stored elsewhere.

For brevity, henceforth the term "cache" is used to mean "data cache" and the terms are used interchangeably.

A cache client is an entity that accesses data stored in the cache, for example a processing unit or an application. In some systems a cache is local to a cache client and separate from a bulk storage where the data is stored, allowing the cache client faster access to a copy of the data stored in the cache than when accessing the data on the bulk storage. For example, when the data is stored on a hard disk drive (HDD), some of the data may be stored in a cache residing in random access memory (RAM). Access to RAM is significantly faster than access to a HDD, thus data stored in the cache in RAM may be served faster than other data stored on a HDD. Another example is implementing a cache using fast memory, which is more expensive than other memory with slower access time used to store the data. Another example is when the data is stored on a network connected storage. A cache client may store a copy of some of the data on a local storage, which may be volatile or non-volatile. In this example, accessing data on the local storage does not require communication over a network, and thus may be faster.

A cache may not store copies of all the data stored in the bulk storage. Some caches are used to store data the cache client recently accessed or accesses frequently, improving the cache client's performance by serving such requests faster than when they are served from the bulk storage. When a cache stores copies of only part of the data stored on the bulk storage, there is a need to determine whether a data access request from the cache client can be served from the cache or whether there is a need to access the bulk storage of the data. The term cache metadata means information documenting a plurality of data items stored in the cache, for example each a copy of a data item stored in the bulk-storage, and is used for managing the cache. Such information may include a time a copy of the data item was accessed and a source of the data item on the permanent storage, for example a memory address or a file name.

Over time, a cache client may frequently access a new data item not previously accessed and there may be a need to add to the cache a copy of the new data item. When capacity of the cache is limited, there may be a need to remove from the cache a copy of another data item in order to create a copy of the new data item in the cache. A least-recently-used (LRU) cache is a cache where when there is a need to remove a data item from the cache a least recently used data item is first to be removed.

SUMMARY

According to an aspect of the present invention, there is a method, computer program product and/or system for managing a data cache that performs the following operations (not necessarily in the following order): (i) storing a cache management list comprising a plurality of entries, the cache management list comprising: (a) a tail part stored in a first storage, and documenting a plurality of recently accessed data items stored in a data cache, and (b) a body part stored in a second storage, and documenting a plurality of less recently accessed data items stored in the data cache; (ii) in each cache management iteration of a plurality of cache management iterations: (a) receiving a first data access request; (b) documenting the first data access request in the tail part; (c) identifying a plurality of duplicated entries, associated with the first data access request, present in the body part and the tail part; and (d) removing each of the plurality of duplicated entries from the body part according to a physical organization in the second storage of the plurality of duplicated entries.

BRIEF DESCRIPTION OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

DETAILED DESCRIPTION

Figure 1:
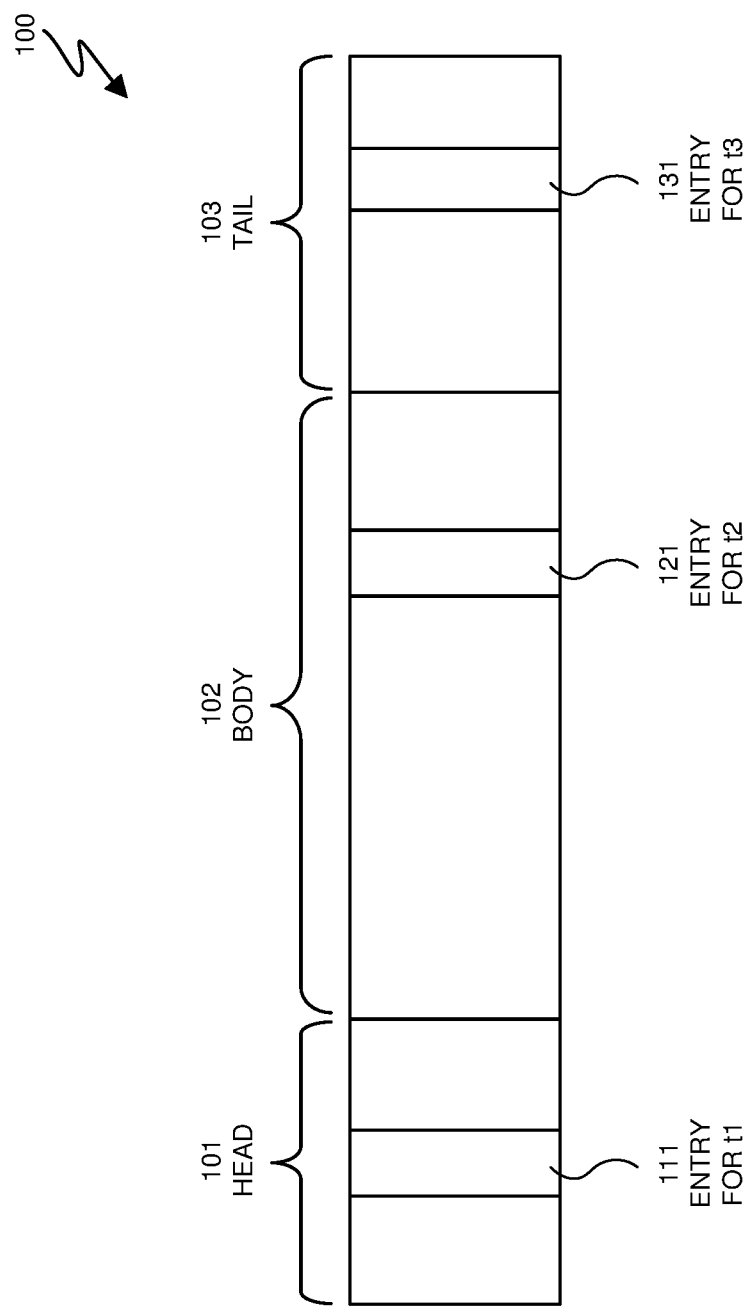
FIG. 1 is a block diagram of a cache management list in accordance with at least one embodiment of the present invention.

The following description focuses on using a cache management list comprising a plurality of entries, and more specifically focuses on managing a least-recently-used (LRU) cache. However, the following description may be applied to other cache replacement policies schemes other than LRU, where another test may be applied to distinguish between a plurality of parts of the cache management list, for example most recently used, first-in-first-out, and last-in-last-out.

A cache hit is an occurrence where the cache client accesses a data item that exists in the cache. A cache miss is an occurrence where the cache client requests access to a data item that does not exist in the cache (a missed data item). When a cache miss occurs there is a need to access the bulk-storage to access the missed data item. In addition, there may be a need to add to the cache a copy of the missed data item.

Some embodiments of the present disclosure describe a system and a method for managing a memory cache, where an amount of metadata documenting a plurality of data items of the cache exceeds an amount of a first storage available for the metadata. In such embodiments, the metadata is divided between the first storage where a plurality of recently accessed data items are documented and a second storage where a plurality of less recently accessed data items are documented. Optionally, the metadata in the first and second storages is synchronized in each of a plurality of cache management iterations.

The foregoing and other objects are achieved by the features of the independent claims. Further implementation forms are apparent from the dependent claims, the description and the figures.

According to a first aspect of the invention, a method for managing a data cache comprises storing a cache management list comprising a plurality of entries and having a tail part stored in a first storage and documenting a plurality of recently accessed data items stored in the data cache, and a body part stored in a second storage and documenting a plurality of less recently accessed data items stored in the data cache. Optionally, the method comprises in each of a plurality of cache management iterations receiving at least one data access request, documenting the at least one data access request in the tail part, identifying a plurality of duplicated entries present in the body part and the tail part, and removing each of the plurality of duplicated entries from the body part in the second storage according to a physical organization in the second storage of the plurality of duplicated entries. Documenting data accesses in the tail part when the tail part resides in the first storage facilitates increasing throughput of managing the cache compared to when the first storage is not large enough to store the entire cache management list and the entire cache management list resides on the second storage, for example when access to the first storage is faster than access to the second storage. Removing each of the plurality of duplicated entries from the body part according to the physical organization of the plurality of duplicated entries in the second storage reduces an amount of time required for updating the body part compared to removing the plurality of duplicated entries in a random order.

According to a second aspect of the invention, a system for managing a data cache, comprises at least one hardware processor adapted for: storing a cache management list comprising a plurality of entries and having: a tail part stored in a first storage connected to the at least one hardware processor, and documenting a plurality of recently accessed data items stored in the data cache, and a body part stored in a second storage connected to the at least one hardware processor, and documenting a plurality of less recently accessed data items stored in the data cache; and in each of a plurality of cache management iterations: receiving at least one data access request; documenting the at least one data access request in the tail part; identifying a plurality of duplicated entries present in the body part and the tail part; and removing each of the plurality of duplicated entries from the body part in the second storage according to a physical organization in the second storage of the plurality of duplicated entries.

According to a third aspect of the invention, a system for managing access to a plurality of data items comprises: a data cache, storing at least some of the plurality of data items; and at least one hardware processor connected to the data cache and adapted for managing the data cache by: storing a cache management list comprising a plurality of entries and having a tail part stored in a first storage and documenting a plurality of recently accessed data items stored in the data cache, and a body part stored in a second storage and documenting a plurality of less recently accessed data items stored in the data cache; and in each of a plurality of cache management iterations: receiving at least one data access request; documenting the at least one data access request in the tail part; identifying a plurality of duplicated entries present in the body part and the tail part; and removing each of the plurality of duplicated entries from the body part in the second storage according to a physical organization in the second storage of the plurality of duplicated entries. Managing the data cache as described above facilitates increasing throughput of the system for managing access to the plurality of data items.

In an implementation form of the first and second aspects, the cache management list further has a head part stored in the first storage and documenting a plurality of least recently accessed data items stored in the data cache. Optionally the method further comprises in at least some of the plurality of cache management iterations: identifying in the body part a new plurality of least recent entries, documenting a new plurality of least recently accessed data items stored in the data cache; and copying the new plurality of least recent entries from the body part in the second storage to the head part in the first storage. Storing the head part in the first storage facilitates increasing throughput of managing the cache compared to storing the entire cache management list on the second storage when the first storage is not large enough to store the entire cache management list, for example when access to the first storage is faster than access to the second storage.

In another implementation form of the first and second aspects, the method further comprises copying the tail part to the second storage. Optionally, the body part is stored in the second storage in a plurality of files. Optionally, copying the tail part to the second storage comprises adding a file, comprising the tail part, to the plurality of files. Copying the tail part to the second storage facilitates persisting the tail part, when the second storage is a non-volatile storage. Adding a file facilitates reducing an amount of time required to copy the tail part to the second storage, for example compared to updating existing files.

In a further implementation form of the first and second aspects, documenting the at least one data access request in the tail part comprises at least one of: updating an entry of the tail part, documenting another access request to the respective data item documented thereby, and moving the updated entry to an end of the tail part; and adding a new entry to the tail part. Optionally, at least one other cache management iteration of the plurality of cache management iterations is executed subject to identifying the tail part is full. Optionally, at least some of the plurality of cache management iterations are executed periodically. Executing the at least one other cache management iteration subject to identifying the tail part is full facilitates identifying a candidate for eviction from the cache from the body part and not from the tail part, thus increasing throughput of managing the cache by reducing a likelihood of a future cache miss. In addition, executing at least some of the plurality of cache management iterations periodically facilitates increasing throughput of managing the cache by increasing a to identify a candidate for eviction from the head part and reducing a likelihood of executing a cache management iteration when responding to a data access request.

In a further implementation form of the first and second aspects, the method further comprises in at least one cache management iteration of the plurality of cache management iterations identifying a data access request of the at least one data access request requesting access to a data item not stored in the data cache, and inserting the data item into the data cache. Optionally, the cache management list further has a head part stored in the first storage and documenting a plurality of least recently accessed data items stored in the data cache. Optionally, the method further comprises in the at least one cache management iteration: identifying at least one entry of the head part not in the tail part and documenting access to at least one data item stored in the data cache, and removing the at least one entry from the head part. Optionally, at least one yet other cache management iteration of the plurality of cache management iterations is executed subject to failing to identify the at least one entry of the head part not in the tail part. Executing at least one yet other cache management iteration of the plurality of cache management iterations subject to failing to identify in the head part at least one entry of the head part not in the tail part facilitates identifying a candidate for eviction from the cache from the body part and not from the tail part, thus increasing throughput of managing the cache by reducing a likelihood of a future cache miss.

In a further implementation form of the first and second aspects, a ratio between a first access time of the first storage and a second access time of the second storage is less than an access time ratio threshold. Using a first storage having an access time such that the ratio between a first access time of the first storage and a second access time of the second storage is less than an access time ratio threshold reduces an amount of time to respond to a memory access request compared to when the entire cache management list is stored on the second storage.

In a further implementation form of the first and second aspects, the first storage is selected from a first group of digital storage consisting of: a random access memory (RAM), a static RAM (SRAM), a dynamic RAM (DRAM), a hard disk drive, and a solid-state drive; and the second storage is selected from a second group of digital storage consisting of: a DRAM, a hard disk drive, a solid-state drive, an electronically-erasable programmable read-only memory (EEPROM), a NAND-type flash memory, a network connected storage, and a network storage.

In a further implementation form of the first and second aspects, at least one of the at least one data access request is received from a software object executed by the at least one hardware processor. Optionally, the at least one other of the at least one data access request is received from at least one other hardware processor connected to the at least one hardware processor. Optionally, the at least one other hardware processor is connected to the at least one hardware processor via at least one digital communication network interface connected to the at least one hardware processor.

In an implementation form of the third aspect, the at least one hardware processor is further adapted for: receiving at least one other data access request, requesting access to at least one data item of the plurality of data items; identifying the at least one data item in the at least some data items stored in the data cache; and accessing the at least one data item in the data cache in response to the at least one data access request. Accessing the data item in the data cache increases throughput of the system for accessing the plurality of data items, by reducing an amount of times the data items on another storage, for example when the storage is remote to the at least one hardware processor.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the relevant arts. Although methods and materials similar, or equivalent, to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

One possible way to manage a cache is by managing a cache management list comprising a plurality of entries, each documenting a data item stored in the cache. Each entry may comprise documentation of a most recent time the respective data item was accessed by one or more data clients using the data cache. The cache management list may be ordered and have a beginning and an end, such that new entries are added to a part of the cache management list at the end thereof, also called a tail part. In such a cache management list another part at the beginning thereof, also called a head part, comprises the oldest entries of the plurality of entries. Reference is now made to FIG. 1, showing a block diagram of an exemplary cache management list 100. In this example, cache management list 100 comprises head part 101, body part 102 and tail part 103. In this example, head part 101 comprises at least one entry 111, documenting access to a respective data item associated therewith at a first time, denoted by $t_1$. In addition, in this example body part 102 comprises at least one other entry 121, documenting another access to another respective data item associated therewith at a second time, denoted by $t_2$. In addition, in this example tail part 103 comprises at least one additional other entry 131, documenting an additional other access to an additional other respective data item associated therewith at a third time, denoted by $t_3$.

As described above, in a LRU cache when there is a need to remove a data item from the cache a least recently used data item is removed first. A LRU cache may be managed using a cache management list where head part 101 comprises one or more entries documenting one or more least recently accessed data items, and one or more other entries documenting one or more recently accessed data items are in tail part 103. For example, in cache management list 100, $t_3$ may be equal or more recent than $t_1$ and $t_2$, that is $t_3$ is equal or later than both $t_1$ and $t_2$. Also in this example, $t_1$ may be equal or less recent than $t_2$ and $t_3$, that is $t_3$ is equal or earlier than both $t_2$ and $t_3$. The one or more recently accessed data items may be one or more most recently accessed data items, that is a time associated with any entry in tail part 103 may be no later than any other time associated with any other entry in body part 102 or in head part 101. A plurality of less recently accessed data items may be documented by a plurality of other entries in body part 102 of the list. For example, $t_2$ may be equal or less recent than $t_3$, that is $t_2$ is equal or earlier than $t_3$.

According to some cache replacement policies, when there is a need to replace a data item in the cache, that is remove one or more existing data items in order to store another data item in its place, one or more entries are selected from head part 103, for example entry 131, and the respective data items associated with the selected entries are replaced in the cache. In such policies, when a new data item is added to the cache, an entry documenting access to the new data item is added to tail part 101.

To increase throughput of a cache client accessing the cache the cache management list is typically stored in memory or storage the cache client has fast access to. For example, when the cache client is a hardware processor, the cache management list may be stored in a local memory component, electrically couples to the hardware processor. However, depending on an amount of a plurality of data items having copies stored in the cache and additionally or alternatively depending on an amount of data describing access to each data item in the cache, a size of the cache management list may exceed an amount of storage allocated to storing the cache management list. In the above example, the size of the cache management list may exceed an amount of local memory allocated to storing the cache management list.

Increasing an amount of storage or memory for storing the cache management list may be prohibited by a cost of such storage or memory, as fast storage and fast memory are typically more expensive than slower storage or memory. A possible solution is to store the cache management list in a larger storage, for example a hard disk drive. However, a large storage is typically slower than other storage typically used to store a cache management list. In addition, in some technologies for large storage, for example hard disk drive, access time to one entry of the cache management list is effected by a physical organization of the plurality of entries of the cache management list in the storage. Accessing more than one of the plurality of entries without considering the physical organization in the storage of the plurality of entries may be considerably slower than when the more than one entries are accessed according to the physical organization in the storage thereof. For example, when the cache management list is stored on a hard disk drive in a file, opening and closing the file to access one entry at a time may be considerably slower than opening a file and accessing all of the one or more entries in the file before closing the file.

Some embodiments described herein propose dividing the cache management list between two storages with the tail part, documenting a plurality of recently accessed data items stored in the cache, residing in a first storage, and the body part, documenting a plurality of less recently accessed data items stored in the cache, residing in a second storage. The first storage may be faster than the second storage such that a first access time, indicative of an amount of time required to retrieve data from the first storage, may be smaller than a second access time, indicative of an amount of time required to retrieve data from the second storage. The first storage may be significantly faster than the second storage such that a ratio between the first access time and the second access time is less than an access time ratio threshold, for example less than 0.1 or less than 0.01, i.e. the first storage is at least 10 times faster, or 100 times faster respectively, than the second storage. For example, the first storage may be a static RAM (SRAM) and the second storage may be a RAM. In another example, the first storage is a RAM and the second storage is a HDD or a solid-state drive (SSD). In another example, the first storage is a SSD having a faster access time than another SSD used for the second storage.

In such embodiments, one or more data access requests are documented in the tail part. When the accessed data item is in the cache (cache hit), the access is documented by adding an entry to the tail part or updating an existing entry, for example by being moved to an end of the tail part. When a data item is added to the cache, an entry documenting access to the data item is added to the tail part. An entry is considered a duplicate of another entry when the entry and the other entry both document access to the same data item. The entry and the other entry may document separate accesses to the same data item. Documenting data accesses in the tail part when the tail part resides in the first storage facilitates increasing throughput of managing the cache compared to when the first storage is not large enough to store the entire cache management list and the entire cache management list resides on the second storage, for example when access to the first storage is faster than access to the second storage.

As data accesses are documented only in the tail part, over time the tail may comprise one or more entries that are duplicates of one or more entries in the body part. The present disclosure proposes, in some embodiments described herein, identifying a plurality of duplicated entries present in the body part and in the tail part and removing each of the plurality of duplicated entries from the body part in the second storage. Optionally, removing each of the plurality of duplicated entries from the body part is according to a physical organization of the plurality of duplicated entries in the second storage. For example, when the plurality of duplicated entries is located in a plurality of files in the second storage, removing each of the plurality of duplicated entries may comprises opening each of the plurality of files once and removing all of the plurality of duplicated entries in the file before closing the file. Removing each of the plurality of duplicated entries from the body part according to the physical organization of the plurality of duplicated entries in the second storage reduces an amount of time required for updating the body part compared to removing the plurality of duplicated entries in a random order.

Optionally, identifying the plurality of duplicated entries and removing the plurality of duplicated entries from the body part are done in each of a plurality of cache management iterations (sometimes herein referred to as management iterations). Optionally, one or more of the plurality of management iterations are executed periodically. Optionally, one or more other of the plurality of management iterations are executed subject to identifying that the tail part is full, for example when there is a need to add a new entry to the tail part or after adding a new entry to the tail part. Optionally, the tail part is copied to the second storage, for example when the second storage is a non-volatile storage, for example a HDD or a SSD, and the first storage is volatile, for example RAM.

In addition, in some embodiments, the head part of the cache management list is stored in the first storage. Optionally, a copy of the head part is stored in the first storage. Optionally, when there is a need to remove a data item from the cache, one or more entries of the head part and not in the tail part are identified, where the one or more entries document access to the data item. Optionally, when the data item is removed from the cache, the one or more entries are removed from the head part. Storing the head part in the first storage facilitates increasing throughput of managing the cache compared to storing the entire cache management list on the second storage when the first storage is not large enough to store the entire cache management list, for example when access to the first storage is faster than access to the second storage.

Optionally, one or more additional other of the plurality of management iterations are executed subject to identifying the head part is empty.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
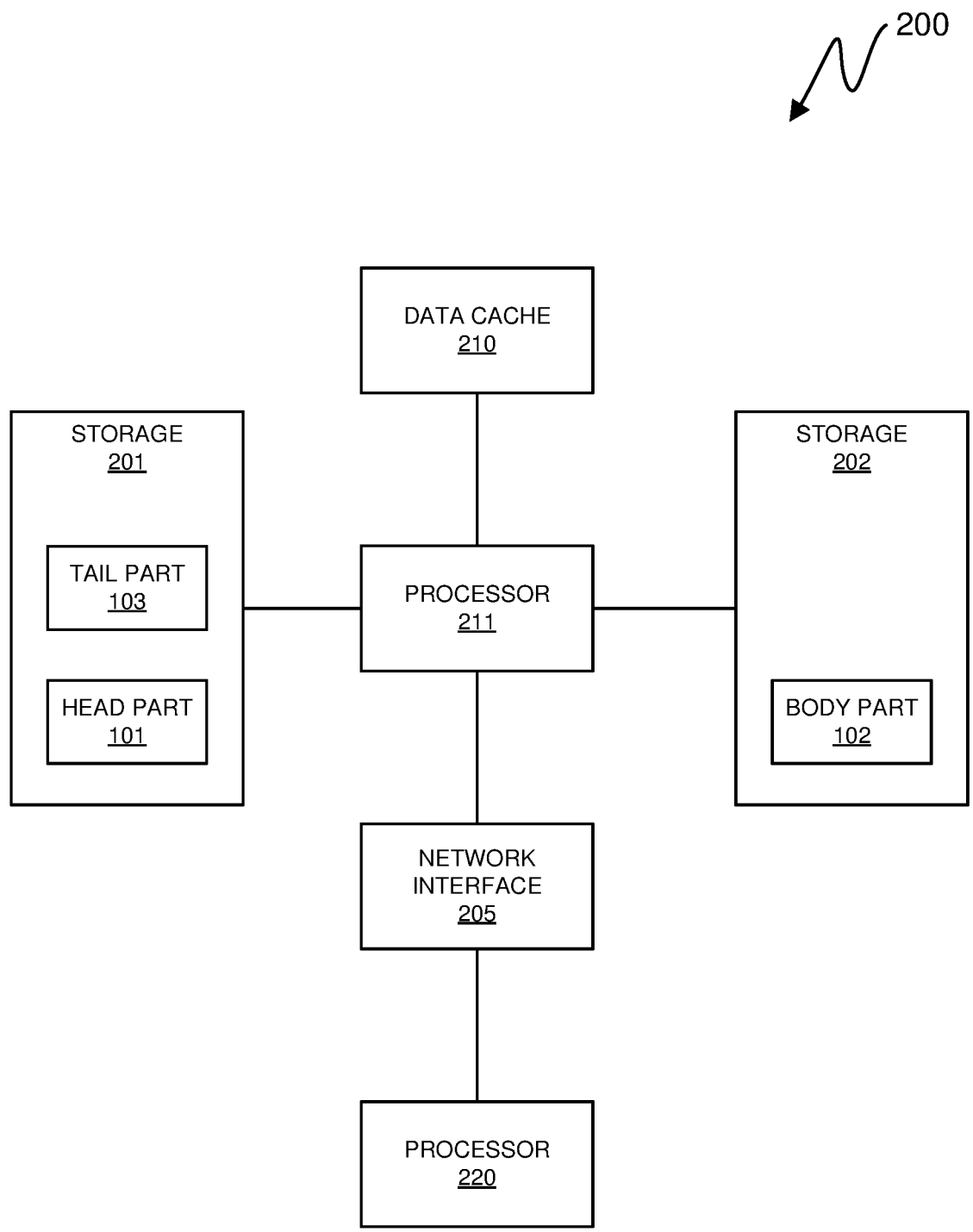
FIG. 2 is a schematic block diagram of a system in accordance with at least one embodiment of the present invention.

Reference is now made to FIG. 2, showing a schematic block diagram of an exemplary system 200, according to some embodiments. In such embodiments, at least one hardware processor 211 is connected to a first storage 201 and a second storage 202. Optionally, first storage 201 is selected from a first group of storage comprising a RAM, a SRAM, a dynamic random access memory (DRAM), a HDD, and a SSD. Optionally, second storage 202 is selected from a second group of storage comprising a DRAM, a HDD, a SSD, an electronically-erasable programmable read-only memory (EEPROM), a NAND-type flash memory, a network connected storage and a network storage. Optionally, first storage 201 is faster than second storage 202 such that a first access time of first storage 201 is less than a second access time of second storage 202. Optionally, a ratio between the first access time and the second access time is less than an access time ratio threshold. Some examples of an access time ratio threshold are 0.1, 0.5, 0.01, 0.035, and 0.0001.

For brevity, henceforth the term "processor" is used to mean "at least one hardware processor" and the terms are used interchangeably.

Optionally, processor 211 is connected to data cache 210. Optionally, data cache 210 comprises a plurality of data items. Optionally, data cache 210 is stored in first storage 201. Optionally, data cache 210 is stored in second storage 202. Optionally, data cache 210 is stored in another storage (not shown) connected to processor 211. Optionally, processor 211 manages data cache 210, optionally using cache management list 100. Optionally, cache management list 100 comprises tail part 103, documenting a plurality of recently accessed data items stored in data cache 210. Optionally, tail part 103 is stored in first storage 201. Optionally, cache management list 100 comprises body part 102, documenting a plurality of less recently accessed data items stored in data cache 210. Optionally, body part 102 is stored in second storage 202. Optionally, cache management list 100 comprises head part 101, documenting a plurality of least recently accessed data items stored in data cache 210. Optionally, head part 101 is stored in first storage 201.

Optionally, processor 211 is connected to one or more digital communication network interface 205. For brevity, the term "network interface" is used to mean "one or more digital communication network interface" and the terms are used interchangeably. Optionally, network interface 205 is connected to a local area network (LAN), for example a wireless LAN or an Ethernet LAN. Optionally, network interface 205 is connected to a wide area network (WAN), for example a cellular network or the Internet. Optionally, first storage 201 is connected to processor 211 via network interface 205. Optionally, second storage 202 is connected to processor 211 via network interface 205.

Optionally, another processor 220 is connected to processor 211, optionally via network interface 205. Optionally, other processor 220 accesses data cache 210, optionally by sending one or more access requests to processor 211.

To manage data cache 210, in some embodiments system 200 implements the following optional method.

Figure 3:
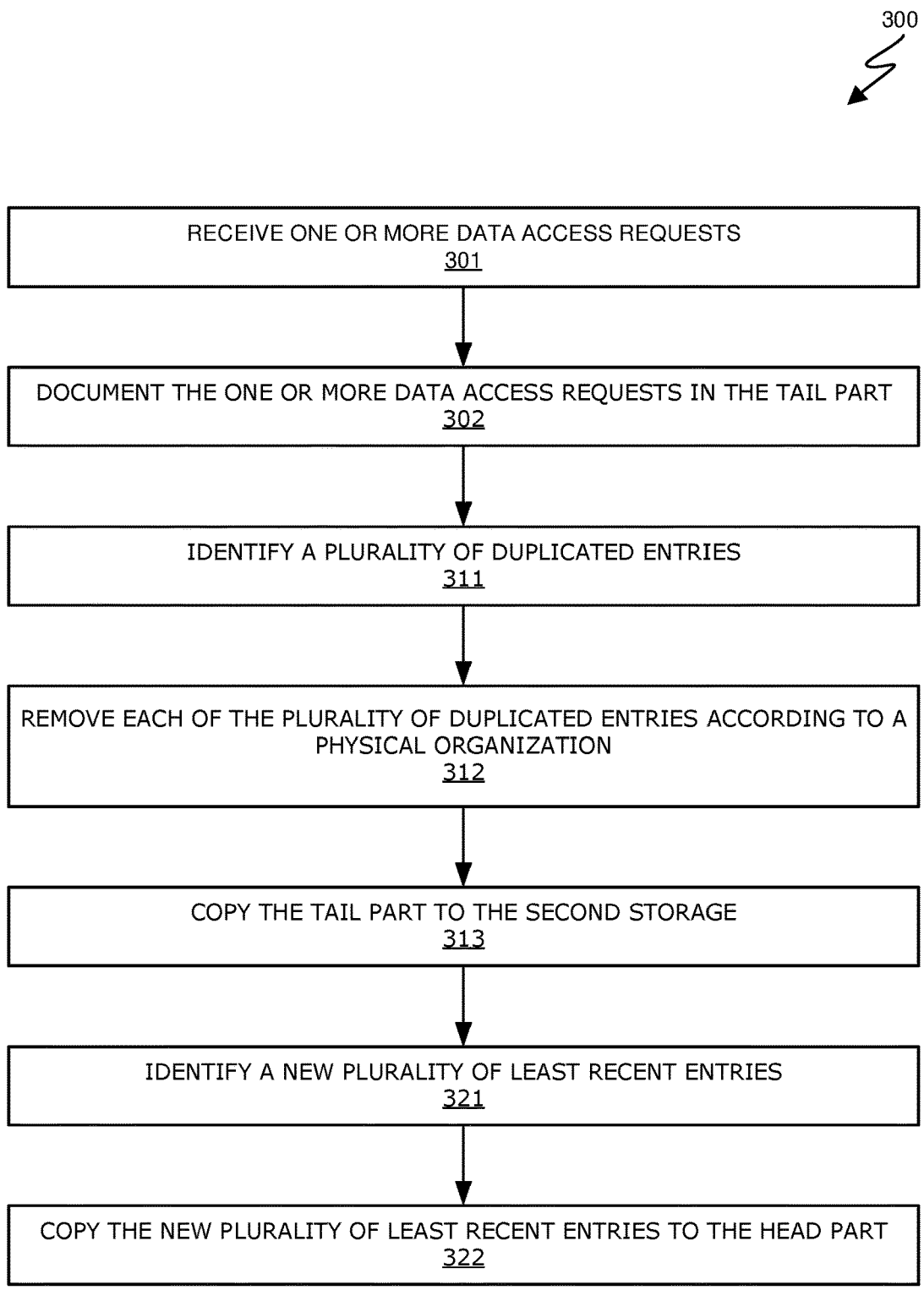
FIG. 3 is a flowchart schematically representing an optional flow of operations for managing a cache in accordance with at least one embodiment of the present invention.

Reference is now made also to FIG. 3, showing a flowchart schematically representing an optional flow of method 300 for managing a cache, according to some embodiments. In such embodiments, in 301 processor 211 receives one or more data access requests. Optionally, at least one of the one or more data access requests is received from a software object executed by processor 211, for example an application. Optionally, at least one other of the one or more data access requests is received from other processor 220, optionally via network interface 205.

In 302, processor 211 optionally documents the one or more data access requests in tail part 103. Optionally, documenting the one or more data access requests in tail part 103 comprises updating an entry of tail part 103, where the entry documents another access request to the respective data item documented by the entry. Optionally, documenting the one or more data access requests in tail part 103 further comprises moving the updated entry to an end of tail part 103. Optionally, documenting the one or more data access requests in tail part 103 comprises adding a new entry to tail part 103, optionally at the end of tail part 103.

Over time, there may be a need to synchronize between body part 102 and tail part 103. In 311, processor 211 optionally identifies a plurality of duplicated entries present in body part 102 and in tail part 103. In 312, processor 211 optionally removes each of the plurality of duplicated entries from body part 102 in second storage 202 according to a physical organization in second storage 202 of the plurality of duplicated entries.

Optionally, 301, 302, 311 and 312 are executed in each of a plurality of management iterations. Optionally, at least some of the plurality of management iterations are executed periodically. Optionally, one or more of the plurality of management iterations is executed subject to identifying that tail part 103 is full. Optionally, in one or more of the plurality of management iterations, in 313 processor 211 copies tail part 103 to second storage 202, for example when second storage 202 is non-volatile, for the purpose of creating a persistent copy of tail part 103. Optionally, body part 102 is stored in second storage 202 in a plurality of files. Optionally, copying tail part 103 to second storage 202 comprises adding a file comprising tail part 103 to the plurality of files.

In at least one management iteration of the plurality of management iterations, at least one of the one or more data access requests may result in a cache miss, where the at least one data access request is a request to access a data item not stored in data cache 210.

Figure 4:
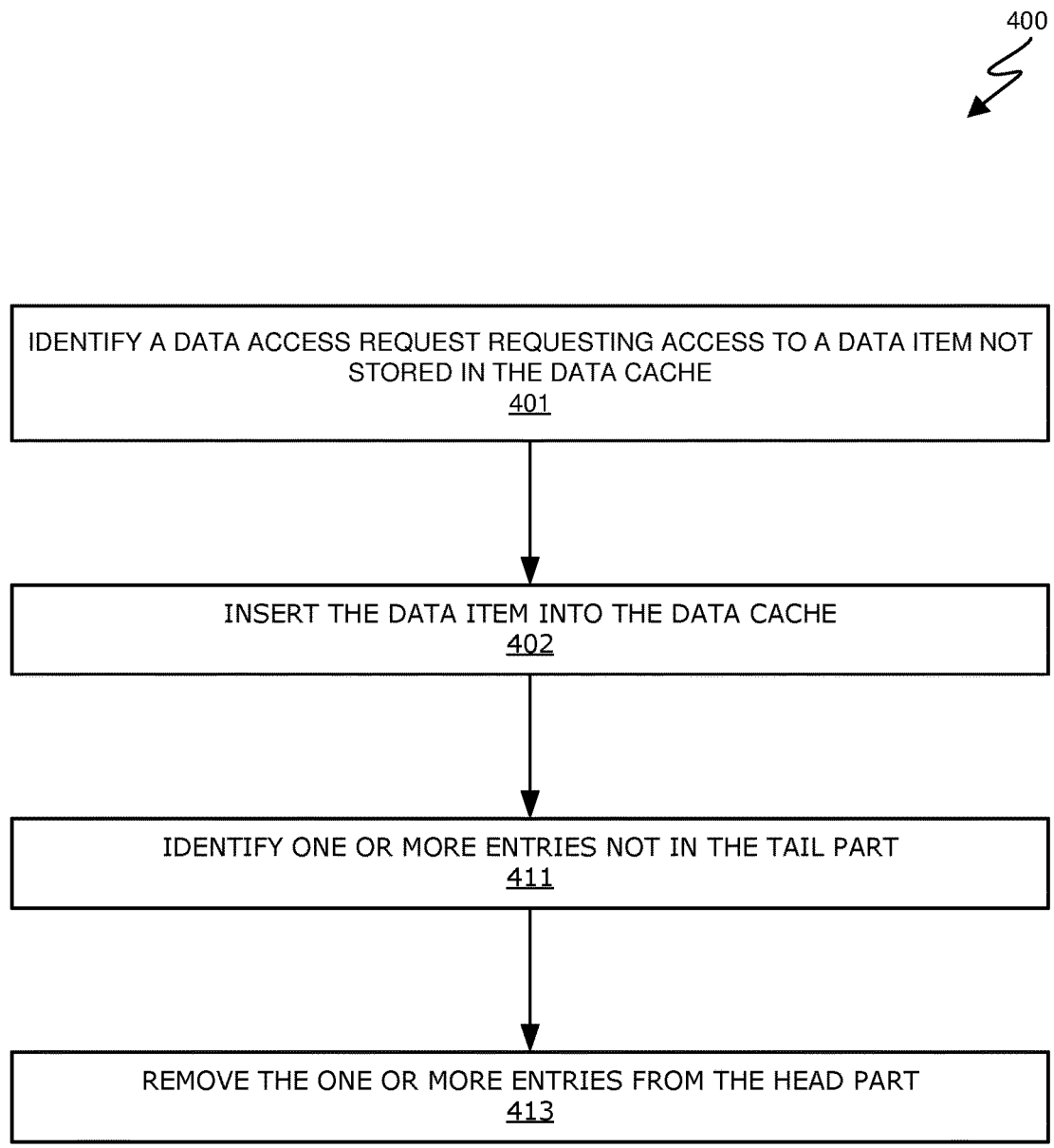
FIG. 4 is a flowchart schematically representing an optional flow of operations for a cache miss in accordance with at least one embodiment of the present invention.

Reference is now made also to FIG. 4, showing a flowchart schematically representing an optional flow of operations 400 for a cache miss, according to some embodiments. In such embodiments, in 401 processor 211 identifies a data access request, of the one or more data access requests, requesting access to a data item not stored in data cache 210. Optionally, in 402, processor 211 inserts the data item into the data cache. Optionally, to document the data access request there is a need to evict one or more data items from data cache 210. Optionally, in 411 processor 211 identifies one or more entries of head part 101 not in tail part 103, where the one or more entries document access to at least one data item stored in data cache 210. For example, processor 211 may check whether an entry in head part 101 documenting a first accessed data item is in tail part 103 and continue in increasing order of access time until identifying the one or more entries of head part 101 not in tail part 103. Optionally, the one or more entries of head part 101 are not in tail part 103 and not in body part 102. In 413 processor 211 optionally removes the one or more entries from head part 101.

Reference is now made again to FIG. 3. There may be a need to update head part 101 stored in first storage 201. In at least some of the plurality of management iterations, in 321 processor 211 optionally identifies in body part 102 a new plurality of least recent entries and in 322 processor 211 optionally copies the new plurality of least recent entries from body part 102 in second storage 202 to head part 101 in first storage 201. Optionally, upon copying the new plurality of least recent entries from body part 102 to head part 101 processor 211 additionally removes the new plurality of least recent entries from body part 102, effectively moving the new plurality of least recent entries from body part 102 to head part 101. Optionally, processor 211 removes the new plurality of least recent entries from body part 102 in another of the plurality of management iterations. Optionally, processor 211 executes the at least some of the plurality of management iterations subject to failing to identify in 411 the one or more entries of head part 101 not in tail part 103, for example when head part 101 is empty.

In some embodiments, system 200 manages access to a plurality of data items, for example a plurality of data items stored in a cloud-based object storage service. In this example, a bulk of the plurality of data items is stored in a storage remote to processor 211. In such embodiments, data cache 210 stores a plurality of copies, one each of at least some of the plurality of data items. Optionally, the copies stored in data cache 210 comprise more than 100 Terabytes of storage. Optionally, data cache 210 is stored in one or more HDDs and additionally or alternatively one or more SSDs. Optionally, second storage 202 storing body part 102 is one or more other HDDs and additionally or alternatively one or more other SSDs. Optionally, first storage 201 storing head part 101 and tail part 103 is a memory component coupled with processor 211.

In some embodiments, to manage access to the plurality of data items, system 200 implements the following non-mandatory method.

Figure 5:
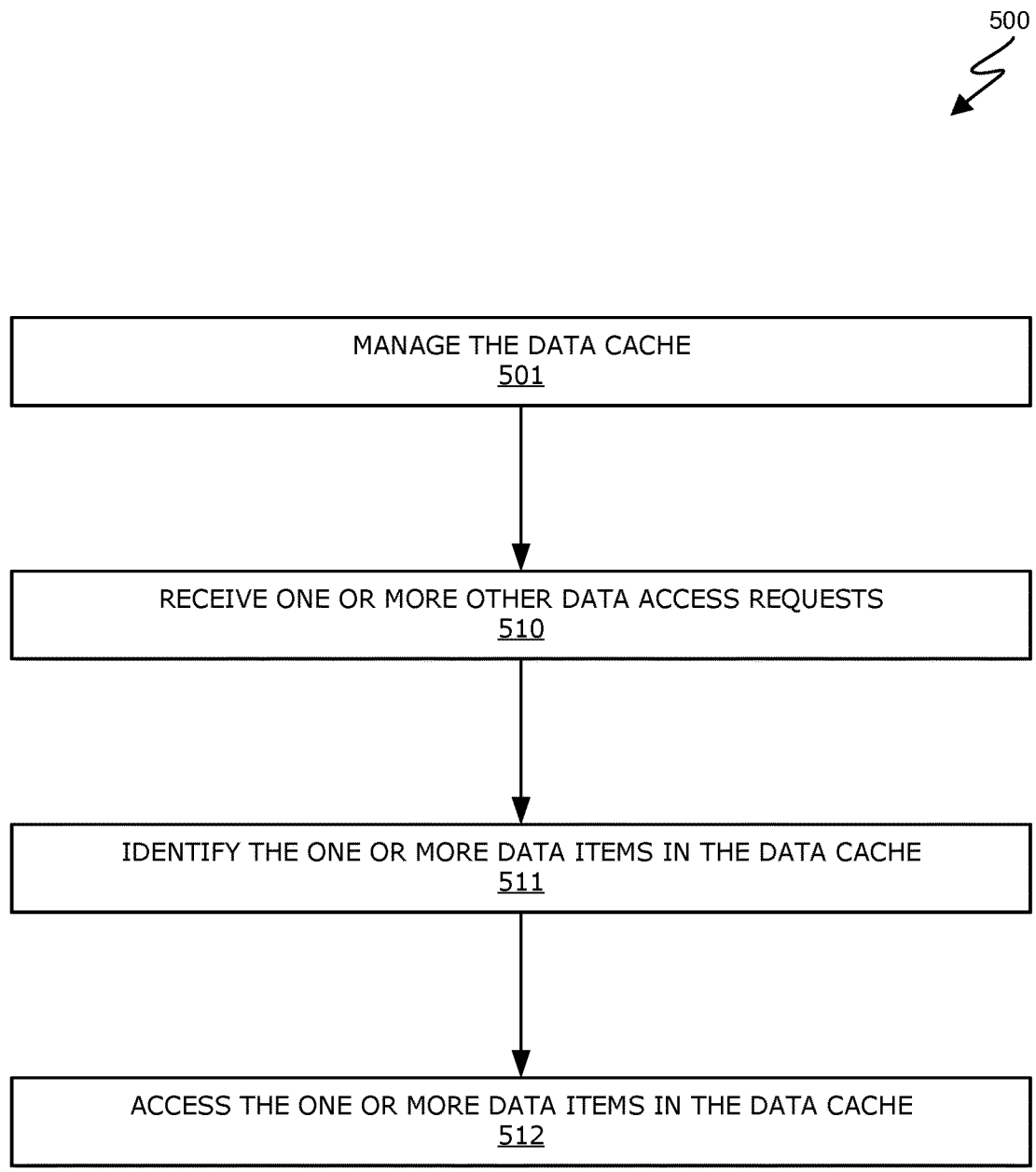
FIG. 5 is a flowchart schematically representing an optional flow of operations for managing access to a plurality of data items.

Reference is now made also to FIG. 5, showing a flowchart schematically representing an optional flow of operations 500 for managing access to a plurality of data items, according to some embodiments. In such embodiments, in 501 processor 211 manages data cache 210, optionally using method 300. In 510, processor 211 optionally receives one or more data access requests, for example from other processor 220 or from a software object executed by processor 211. Optionally the one or more data access requests request access to at least one data item of the plurality of data items. In 511, processor 211 optionally identifies the at least one data item in data cache 210, i.e. in the copies of the at least some of the plurality of data items stored in data cache 210. In 512, processor 211 optionally accesses the at least one data item in data cache 210 in response to the one or more data access requests.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant storages will be developed and the scope of the term "storage" is intended to include all such new technologies a priori. In addition, it is expected that during the life of a patent maturing from this application many relevant data items and cache entries will be developed and the scope of the terms "data item" and "entry" are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable sub-combination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

Figure 6:
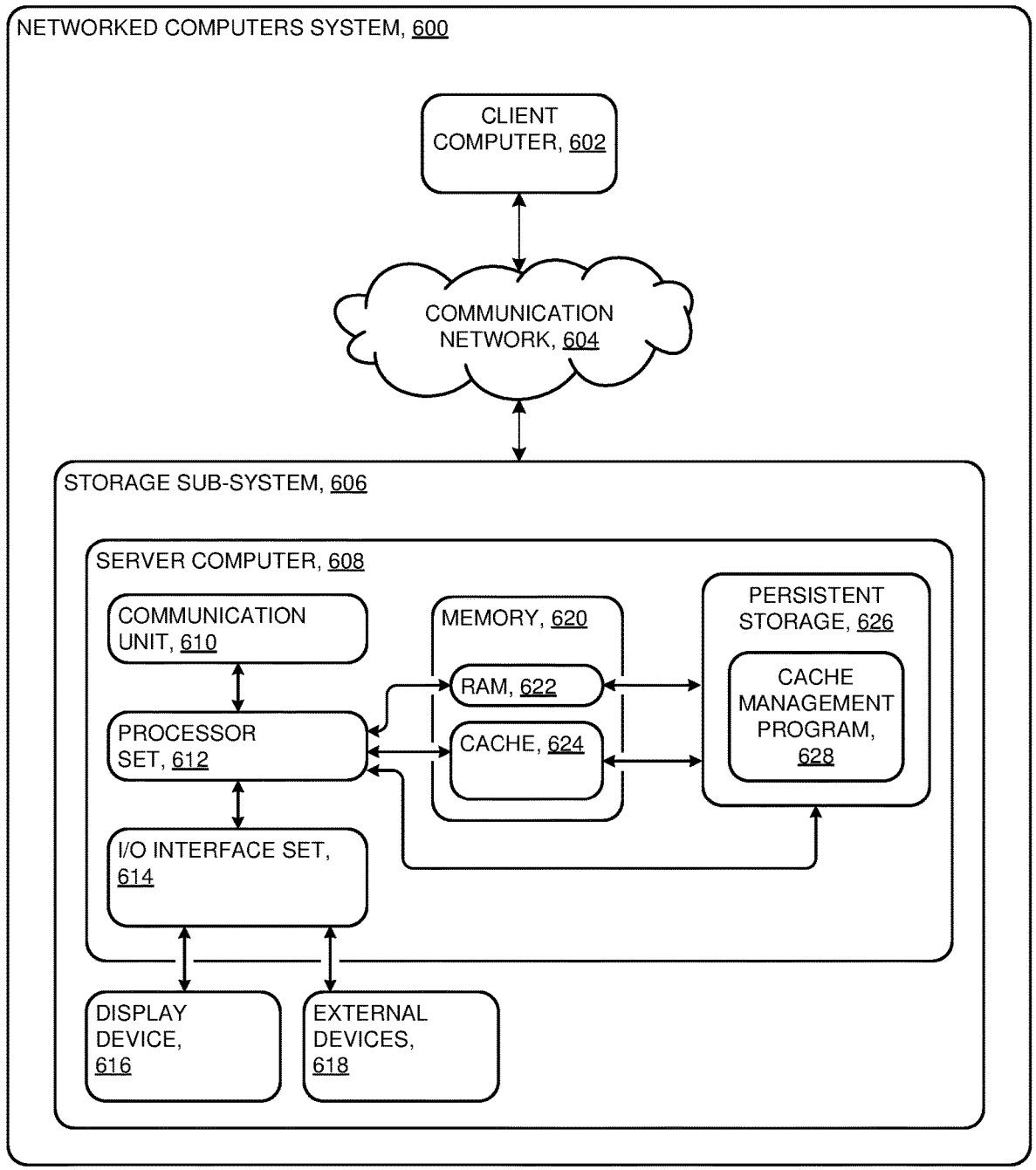
FIG. 6 is a block diagram of a possible hardware and software environment for software and/or methods in accordance with at least one embodiment of the present invention.

An embodiment of a possible hardware and software environment for software and/or methods according to the present invention will now be described in detail with reference to the Figures. FIG. 6 is a functional block diagram illustrating various portions of networked computers system 600, including: client computer 602; communication network 604; storage sub-system 606; server computer 608; communication unit 610; processor set 612; input/output (I/O) interface set 614; display device 616; external devices 618; memory 620; random access memory (RAM 622); cache 624; persistent storage 626; and cache management program 628.

Storage sub-system 606 is, in many respects, representative of the various computer sub-system(s) in the present invention. Accordingly, several portions of storage sub-system 606 will now be discussed in the following paragraphs.

Storage sub-system 606 may be a laptop computer, tablet computer, netbook computer, personal computer (PC), a desktop computer, a personal digital assistant (PDA), a smart phone, or any programmable electronic device capable of communicating with the client sub-systems via communication network 604. Cache management program 628 is a collection of machine readable instructions and/or data that is used to create, manage, and control certain software functions that will be discussed in detail, below, in the Example Embodiment sub-section of this Detailed Description section.

Storage sub-system 606 is capable of communicating with other computer sub-systems via communication network 604. Communication network 604 can be, for example, a local area network (LAN), a wide area network (WAN) such as the Internet, or a combination of the two, and can include wired, wireless, or fiber optic connections. In general, communication network 604 can be any combination of connections and protocols that will support communications between server and client sub-systems.

Storage sub-system 606 is shown as a block diagram with many double arrows. These double arrows (no separate reference numerals) represent a communications fabric, which provides communications between various components of storage sub-system 606. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 620 and persistent storage 626 are computer-readable storage media. In general, memory 620 can include any suitable volatile or non-volatile computer-readable storage media. It is further noted that, now and/or in the near future: (i) external devices 618 may be able to supply, some or all, memory for storage sub-system 606; and/or (ii) devices external to storage sub-system 606 may be able to provide memory for storage sub-system 606.

Cache management program 628 is stored in persistent storage 626 for access and/or execution by one or more of the respective computer processor set 612, usually through one or more memories of memory 620. Persistent storage 626: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 626.

Cache management program 628 may include both machine readable and performable instructions and/or substantive data (that is, the type of data stored in a database). In this particular embodiment, persistent storage 626 includes a magnetic hard disk drive. To name some possible variations, persistent storage 626 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 626 may also be removable. For example, a removable hard drive may be used for persistent storage 626. Other examples include optical and magnetic disks, thumb drives, and smart cards that are inserted into a drive for transfer onto another computer-readable storage medium that is also part of persistent storage 626.

Communication unit 610, in these examples, provides for communications with other data processing systems or devices external to storage sub-system 606. In these examples, communication unit 610 includes one or more network interface cards. Communication unit 610 may provide communications through the use of either or both physical and wireless communications links. Any software modules discussed herein may be downloaded to a persistent storage device (such as persistent storage 626) through a communications unit (such as communication unit 610).

I/O interface set 614 allows for input and output of data with other devices that may be connected locally in data communication with server computer 608. For example, I/O interface set 614 provides a connection to external devices 618. External devices 618 will may include devices such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, for example, cache management program 628, can be stored on such portable computer-readable storage media. In these embodiments, the relevant software may (or may not) be loaded, in whole or in part, onto persistent storage 626 via I/O interface set 614. I/O interface set 614 also connects in data communication with display device 616.

Display device 616 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature, herein, is used merely for convenience, and, thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method for managing a data cache, comprising:
    storing a cache management list comprising a plurality of entries, the cache management list comprising:
        a tail part stored in a first storage documenting a plurality of recently accessed data items stored in a data cache,
        a body part stored in a second storage documenting a plurality of less recently accessed data items stored in the data cache, and
        a head part stored in the first storage documenting a first plurality of least recently accessed data items stored in the data cache;
    in at least one cache management iteration of the plurality of cache management iterations:
        identifying, in the body part, a second plurality of least recently entries;
        documenting a second plurality of least recently accessed data items stored in the data cache; and
        copying the second plurality of least recent entries from the body part to the head part; and
    in each cache management iteration of a plurality of cache management iterations:
        receiving a first data access request;
        documenting the first data access request in the tail part;
        identifying a plurality of duplicated entries, associated with the first data access request, present in the body part and the tail part; and
        removing each duplicated entry of the plurality of duplicated entries from the body part according to a physical organization in the second storage of the plurality of duplicated entries.

2. The method of claim 1, further comprising:
    copying the tail part to the second storage.

3. The method of claim 2, wherein:
    the body part is stored in the second storage in a plurality of files; and
    copying the tail part to the second storage comprises:
        adding a file, comprising the tail part, to the plurality of files.

4. The method of claim 1, further comprising:
    identifying, in at least one cache management iteration of the plurality of cache management iterations and based on the first data access request, a data item not stored in the data cache; and
    inserting the data item into the data cache.

5. The method of claim 4, wherein:
    in at least one cache management iteration of the plurality of cache management iterations, the method further comprises:
        identifying an entry present in the head part, and not present in the tail part, the entry documenting access to the data item stored in the data cache; and
        removing the entry from the head part.

6. The method of claim 5, further comprising:
    determining the entry present in the head part is not included in the tail part; and
    in response to determining the entry present in the head part is not included in the tail part, executing at least one cache management iteration of the plurality of cache management iterations.

7. The method of claim 1, wherein documenting the first data access request in the tail part comprises an operation selected from the group consisting of:
    updating a first entry of the tail part, the first entry documenting another access request to a respective data item documented thereby, and moving the updated first entry to an end of the tail part; and
    adding a second entry to the tail part.

8. The method of claim 1, wherein at least a cache management iteration of the plurality of cache management iterations are executed periodically.

9. The method of claim 1, further comprising:
    determining the tail part is full; and
    in response to determining the tail part is full, executing at least one cache management iteration of the plurality of cache management iterations.

10. The method of claim 1, wherein a ratio between a first access time of the first storage and a second access time of the second storage is less than an access time ratio threshold.

11. The method of claim 1, wherein:
    the first storage is selected from a first group of digital storage consisting of:
        a random access memory (RAM),
        a static RAM (SRAM),
        a first dynamic RAM (DRAM),
        a first hard disk drive, and
        a first solid-state drive; and
    the second storage is selected from a second group of digital storage consisting of:
        the first DRAM,
        a second DRAM,
        the first hard disk drive,
        a second hard disk drive,
        the first solid-state drive,
        a second solid-state drive,
        an electronically-erasable programmable read-only memory (EEPROM),
        a NAND-type flash memory,
        a network connected storage, and
        a network storage.

12. A computer system for managing a data cache, the computer system comprising:
    a processor set comprising a first processor and a second processor; and
    one or more computer readable storage media;

wherein:
the processor set is structured, located, connected and/or programmed to execute program instructions collectively stored on the one or more computer readable storage media; and
the program instructions that, when executed by the processor set, cause the processor set to manage a data cache by:
    storing a cache management list comprising a plurality of entries, the cache management list comprising:
        a tail part stored in a first storage connected to the first processor documenting a plurality of recently accessed data items stored in the data cache,
        a body part stored in a second storage connected to the first processor documenting a plurality of less recently accessed data items stored in the data cache; and
        a head part stored in the first storage documenting a first plurality of least recently accessed data items stored in the data cache;
    in at least one cache management iteration of the plurality of cache management iterations:
        identifying, in the body part, a second plurality of least recently entries;
        documenting a second plurality of least recently accessed data items stored in the data cache; and
        copying the second plurality of least recent entries from the body part to the head part; and
    in each cache management iteration of a plurality of cache management iterations:
        receiving a first data access request;
        documenting the first data access request in the tail part;
        identifying a plurality of duplicated entries, associated with the first data access request, present in the body part and the tail part; and
        removing each duplicated entry of the plurality of duplicated entries from the body part according to a physical organization in the second storage of the plurality of duplicated entries.

13. The computer system of claim 12, wherein:
the body part is stored in the second storage in a plurality of files; and
further causing the processor set to manage a data cache by:
copying the tail part to the second storage by adding a file, comprising the tail part, to the plurality of files.

14. The computer system of claim 12, further causing the processor set to manage a data cache by:
identifying, in at least one cache management iteration of the plurality of cache management iterations and based on the first data access request, a data item not stored in the data cache; and
inserting the data item into the data cache.

15. The computer system of claim 14, further causing the processor set to manage a data cache by, in at least one cache management iteration of the plurality of cache management iterations:
identifying an entry present in the head part, and not present in the tail part, the entry documenting access to the data item stored in the data cache; and
removing the entry from the head part.

16. The computer system of claim 15, further causing the processor set to manage a data cache by:
determining the entry present in the head part is not included in the tail part; and
in response to determining the entry present in the head part is not included in the tail part, executing at least one cache management iteration of the plurality of cache management iterations.

17. A computer program product comprising a computer-readable storage medium having a set of instructions stored therein which, when executed by a processor, causes the processor to manage a data cache by:
    storing a cache management list comprising a plurality of entries, the cache management list comprising:
        a tail part stored in a first storage documenting a plurality of recently accessed data items stored in a data cache,
        a body part stored in a second storage documenting a plurality of less recently accessed data items stored in the data cache, and
        a head part stored in the first storage documenting a first plurality of least recently accessed data items stored in the data cache;
    in at least one cache management iteration of the plurality of cache management iterations:
        identifying, in the body part, a second plurality of least recently entries;
        documenting a second plurality of least recently accessed data items stored in the data cache; and
        copying the second plurality of least recent entries from the body part to the head part;
    in each cache management iteration of a plurality of cache management iterations:
        receiving a first data access request;
        documenting the first data access request in the tail part;
        identifying a plurality of duplicated entries, associated with the first data access request, present in the body part and the tail part; and
        removing each duplicated entry of the plurality of duplicated entries from the body part according to a physical organization in the second storage of the plurality of duplicated entries.

18. The computer program product of claim 17, wherein:
the body part is stored in the second storage in a plurality of files; and
further causing the processor set to manage a data cache by:
copying the tail part to the second storage by adding a file, comprising the tail part, to the plurality of files.

19. The computer program product of claim 17, further causing the processor set to manage a data cache by:
identifying, in at least one cache management iteration of the plurality of cache management iterations and based on the first data access request, a data item not stored in the data cache; and
inserting the data item into the data cache.

20. The computer program product of claim 19, further causing the processor set to manage a data cache by, in at least one cache management iteration of the plurality of cache management iterations:
identifying an entry present in the head part, and not present in the tail part, the entry documenting access to the data item stored in the data cache; and
removing the entry from the head part.

21. The computer program product of claim 20, further causing the processor set to manage a data cache by:
determining the entry present in the head part is not included in the tail part; and
in response to determining the entry present in the head part is not included in the tail part, executing at least one cache management iteration of the plurality of cache management iterations.

\* \* \* \* \*